FREQUENCY DISCRIMINATING CIRCUIT

Filed Oct. 13, 1961 2 Sheets-Sheet 1

INVENTORS.
CARL O. PINGRY, III
GEORGE W. HOBGOOD
BY Karl a. Okralik
ATTORNEY.

United States Patent Office 3,202,834
Patented Aug. 24, 1965

3,202,834

FREQUENCY DISCRIMINATING CIRCUIT

Carl O. Pingry III and George W. Hobgood, Lexington, Ky., assignors to International Business Machines Corporation, New York, N.Y., a corporation of New York Filed Oct. 13, 1961, Ser. No. 144,864
2 Claims. (Cl. 307—88.5)

Figure 1:
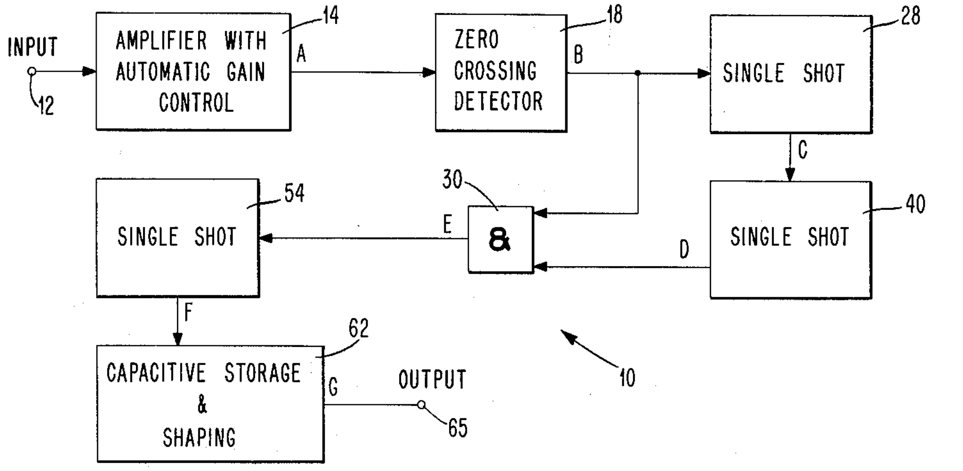

This invention relates to data circuits for handling coded information and more particularly to a frequency discriminating circuit for recreating at a destination, coded information that is transmitted from an information source.

In the relatively long distance transmission of data over telephone lines, many systems use a typewriter as an input or output unit and each character typed by the typewriter is transformed to a binary coded equivalent. The binary digit values may be represented by predetermined potential levels and for transmission over telephone transmission lines, the binary values are transformed from these predetermined potential levels to respective alternating signals of different frequencies. In known systems of the type herein described, the receiving sets at the destinations are provided with resonant circuits that are responsive to the respective alternating signals of different frequencies for producing an indication of their presence or absence. This manner of detecting the presence or absence of a particular signal of a predetermined frequency has met with considerable success, but in general, these systems have certain drawbacks. In order to make capacitors or inductors variable over a relatively large range of parameters, these elements must be constructed in such a manner that they are awkwardly large and difficult to operate, also, they do not readily and easily adapt to a wide enough range of signal frequencies that may be used to represent the different binary values. As an example, a system may be set up to represent binary 1 values by a frequency of, for example, 1800 cycles per second; and binary 0 values by a frequency of 1400 cycles per second. A system like that just noted will usually not readily adapt to other frequency criteria such as 2200 cycles per second, for binary 1 values and 1800 cycles per second for binary 0 values. To provide for a conversion in such a system, it is necessary to change the values of inductors or capacitors in the system and under the circumstances, this is quite difficult. These systems also are not easily adjustable to respond to frequencies within various tolerances. In one case, it may be desirable that a binary 1 be represented by any frequency within a predetermined small band of frequencies, and in another case that the binary 1 be represented by a wider or narrower band of frequencies. The mentioned characteristics and properties of resonant circuits inhibit such versatility. Under certain circumstances it is desirable that this frequency control be facilitated.

Another limitation of prior systems is the relatively large separation that must be established between frequencies representing different binary values to avoid interference therebetween. Even with circuits of relatively high selectivity, the frequency separation is necessarily quite great and this results in relatively inefficient use of the frequency spectrum.

It is, accordingly, a principal object of this invention to provide a circuit that is responsive to signals of different frequencies for providing other signals having respectively different predetermined characteristics and which is easily and readily adjustable to operate at different frequencies and with different tolerances.

It is another object of this invention to efficiently utilize a frequency spectrum in a data transmission system.

It is another object of this invention to provide a data circuit which is relatively simple, inexpensive, and easily adjusted.

It is another object of this invention to provide a frequency discriminating circuit that does not require any resonant circuits.

In accordance with this invention, provision is made for discriminating between a predetermined relatively narrow reference band of frequencies and other frequencies, by providing a novel combination of a zero-crossing detector, a pair of monostable multivibrator (single shot) circuits, and a logical circuit for recognizing signal coincidence. The zero-crossing detector responds to a wide range of alternating signals and produces a pulse at each traverse or zero crossover point of an applied signal. This results in a series of pulses from the zero crossing detector which are applied to the first one of the monostable multivibrator circuits at each half period crossover point of the original signal. The first monostable multivibrator changes from its quiescent condition to its transient condition in response to each crossover pulse. The parameters of this circuit are such that it will produce an output pulse of somewhat less than a half wave period of the desired input in response to each pulse. The output pulses from the first multivibrator circuit are applied in turn to trigger the second monostable multivibrator circuit. The parameters of this circuit are chosen so that the circuit produces individual output pulses of relatively short duration in response to the trailing edges of the output pulses from the first multivibrator circuit. These individual pulses and the crossover pulses from the zero-crossing detector are directed to a suitable logical circuit such as an AND circuit for coincidence detection. By appropriate control of the widths of the respective pulses produced, the combined width of the pulses produced by the two multivibrator circuits is approximately equal to a half wave period of the desired signal. Accordingly, when the desired signal is present at the input to the discriminating circuit, the output pulse of the second multivibrator which results from events initiated by a certain zero-crossing detector output pulse, will coincide with, or at least, overlap the interval of time that is occupied by the next occurring zero-crossing detector output pulse. Under these circumstances, a coincidence of pulses to the logical circuit will occur at only certain desired frequencies within a relatively narrow reference band. At frequencies outside of this band, the output of the second multivibrator will not coincide in time with the pulses produced by the zero-crossing detector. In the embodiment disclosed herein, the output of the logical circuit is used for triggering a third monostable multivibrator for producing a final output to the system.

For high selectivity, the pulses produced by the zero-crossing detector are preferably relatively narrow. To aid in producing such narrow pulses, the amplitude of the input wave is maintained relatively high to establish a relatively high slope in the region of zero potential. The zero-crossing detector produces an output potential in response to input potentials less than a predetermined absolute value, and therefore, a large slope reduces the time period in which the potential is less than such predetermined value.

For preventing spurious operation of the system by signals occurring at frequencies that are harmonic to the predetermined desired frequency, appropriate filter circuits may be provided at the input to the discriminating circuit to thereby prevent passage of such harmonics.

The foregoing and other objects, features, and advantages of the invention will be apparent from the following more particular description of a preferred embodiment of the invention, as illustrated in the accompanying drawings.

FIG. 1 is a block diagram of a frequency discriminating circuit in accordance with the present invention.

Figure 2:
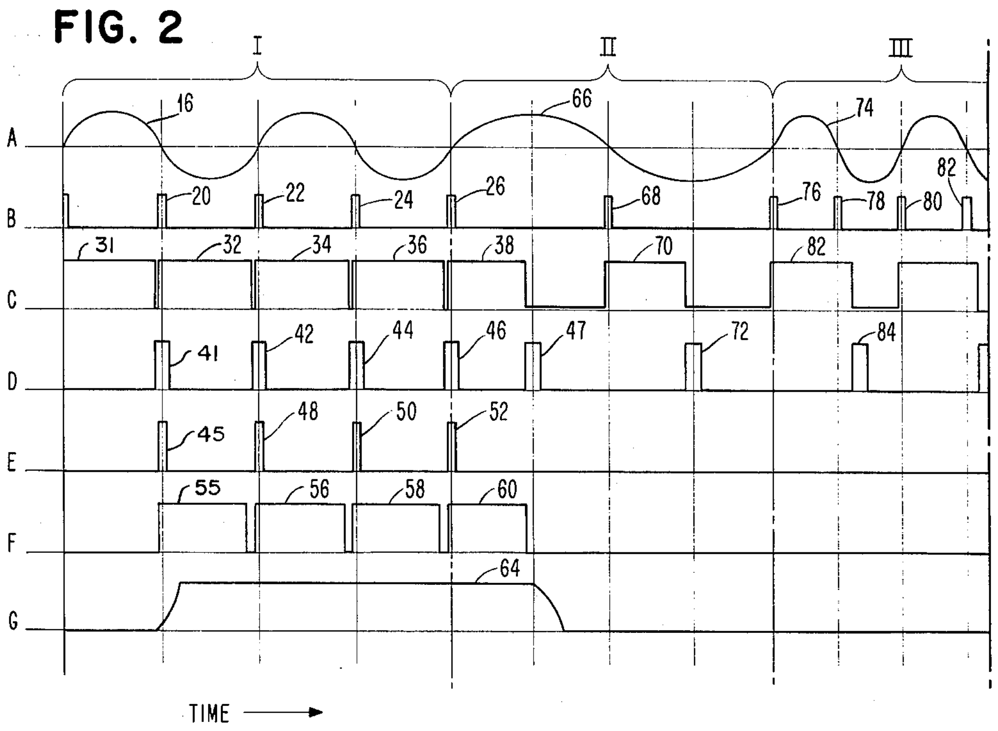
Figure 3:
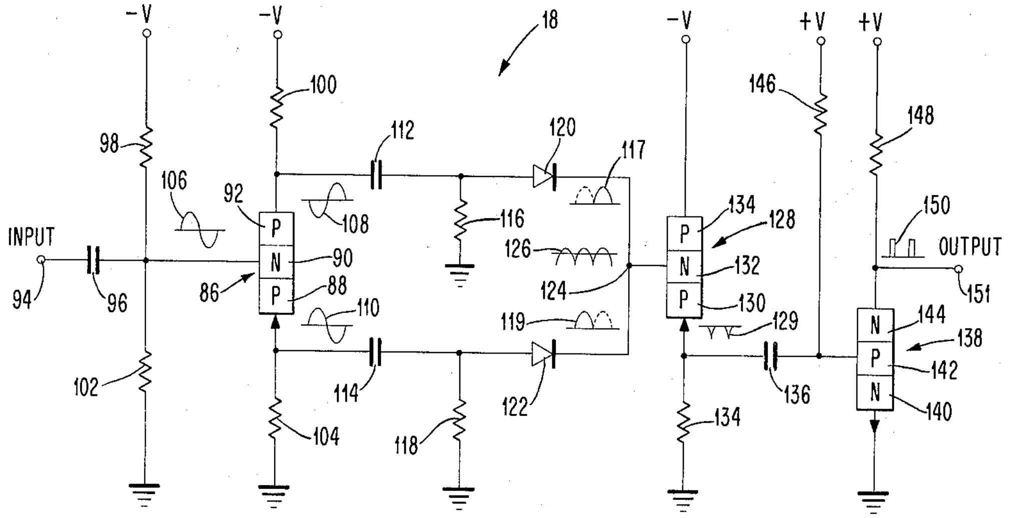
Figure 4:
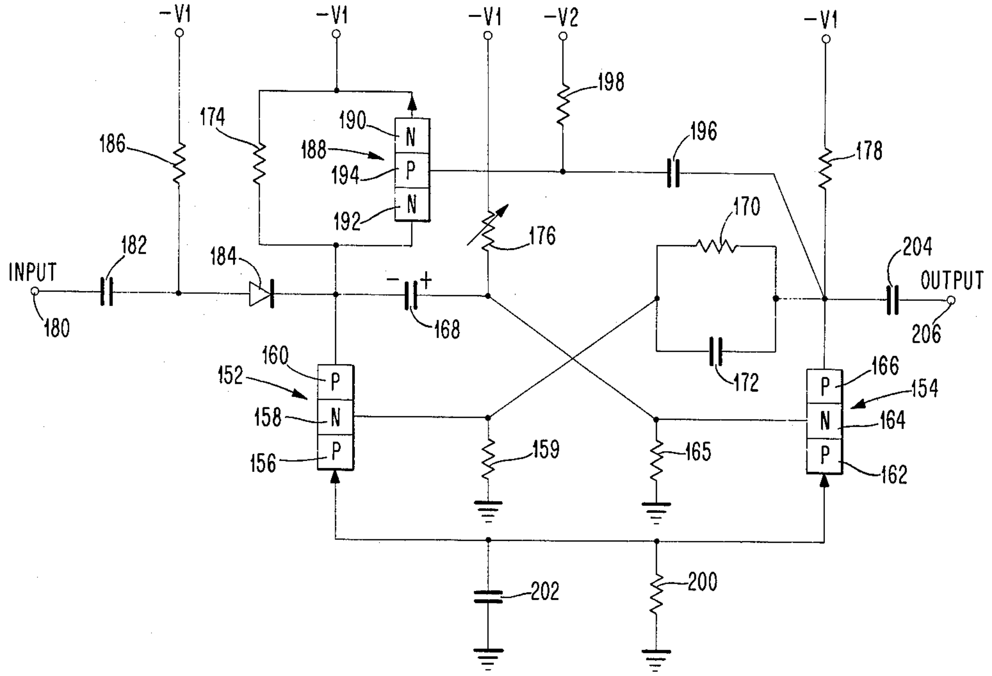

FIG. 2 in parts I, II, and III shows wave forms at the input to the system and the output of respective units in the system, under respective circumstances in which the input signal is within an acceptable very narrow band, or lower than this band and higher than this band, or FIGS. 3 and 4 illustrate details of typical circuits including a zero-crossng detector and a monostable multivibrator circuit which may be used in the circuit of FIG. 1.

Reference is made to the drawings for a more detailed description of the invention. In FIGURE 1, the frequency discriminating circuit is designated generally by the reference numeral 10. Signals are applied at an input terminal 12 to an amplifier circuit block 14. The amplifier 14 increases the amplitude of the signal so that the slope of its wave form is relatively great in the region of zero cross-over points. A typical wave form of a desired signal of predetermined frequency, representing the binary value 1, is shown at 16 in part I of FIGURE 2 of the drawings; wherein the abscissa represents elapsed time and the ordinate represents potential magnitude.

The output signal of the amplifier 14 has the same form as that at 16 and is applied to the input of a zero-crossing detector 18, shown in detail in FIG. 3 of the drawings. This detector produces an output potential in response to the application at its input, of a potential less than a certain value. Thus, it produces a pulse of relatively short duration at each point of zero value of the signal 16 which is directly representative of the frequency of the signal 16. Typical pulses at zero cross-over points of the signal 16 are shown at 20, 22, 24, and 26 in FIG. 2. The output of the zero-crossing detector is applied through the channel to the input of a monostable multivibrator or single-shot circuit designated 28; and the output of the zero-crossing detector is also applied through another channel to an AND (&) circuit represented by the block 30.

The circuit 28 is of a known type as represented in detail in FIG. 4 of the drawings and has a quiescent condition in which its output potential is substantially zero and a transient condition during which its output potential is of a significant value. The circuit is responsive to pulse applied to its input to change from its quiescent condition to its transient condition for a predetermined period of time. This predetermined period of transient condition is established by certain time constant elements within the circuit and is readily and easily controlled by controlling the values of these elements. The output wave form during the transient period of the circuit 28 is typically as shown at 31, 32, 34, 36, and 38 in FIG. 2 of the drawings. It is noted that these pulses are initiated at substantially the same time as the respective pulses 20, 22, 24, and 26; and that each has a time duration just less than a half period to signal signal 16.

The output of the monostable multivibrator 28 is applied as the input to another monostable multivibrator or single-shot circuit shown at block 40. The details of this circuit may be similar to those for circuit 28 and of any suitable conventional construction. This monostable multivibrator is triggered at each end of the transient period of multivibrator 28. Typical output pulses from circuit 40 are represented at 41, 42, 44, 46, and 47 in FIG. 2. These pulses are initiated at the trailing edges of the respective pulses 31, 32, 34, 36, and 38.

The duration of the pulses, 41, 42, 44, and 46 is relatively short; but at a predetermined desired frequency, as represented by the signal 16, the overall combined period of time occupied by a single pulse from multivibrator 28 and the related pulse from multivibrator 40 is just greater than a half period of the signal 16 whereby pulses 41, 42, 44, and 46, for example, occur in coincidence with respective pulses 20, 22, 24, and 26 from the zero-crossing detector 18.

The output of the monostable multivibrator 40 is applied as a second input to the AND circuit 30; and thus, in response to a coincidence of the pulses as shown at 20 and 41, 22 and 42, 24 and 44, and 26 and 46, the AND circuit 30 provides output potential pulses as represented at 45, 48, 50, and 52 in FIG. 2 of the drawings. The pulses from the AND circuit 30 are provided as an input to still another monostable multivibrator or single-shot circuit shown at block 54.

In response to input pulses and during periods of transient condition, circuit 54 produces output pulses as shown at 56, 58, and 60 in FIG. 2 of the drawings. In a data transmitting system, the binary number 1 may be represented by the presence of a direct potential. The output of the circuit 54 may be applied to a suitable capacitive storage and shaping circuit as represented by the block 62. This circuit is effective for producing at an output terminal 65, an output potential as represented by wave form 64 in FIG. 2 of the drawings in response to the pulses 55, 56, 58, and 60. The storage capabilities of circuit 62 maintain an output potential during the combined intervals of consecutive pulses such as shown at 55, 56, 58, and 60 from the circuit 54. This output potential may be assumed to represent a binary 1 value.

From the foregoing description it is noted that in response to a signal of predetermined frequency, as represented by the wave form 16 in FIG. 2 of the drawings, applied to the input terminal 12 of the circuit in FIG. 1, a final pulse as represented by the wave form 64 is produced at the output of the circuit. In response to an input signal of a slightly different frequency, as for example, of a lower frequency as represented by the wave form 66 in part II of FIG. 2 of the drawings, no potential is produced at the circuit output. In this circumstance, a pulse is produced by the zero-crossing detector 18 at a point near zero potential of the input signal 66. This is represented by the pulse 68, and this pulse is effective to trigger the single-shot circuit 28 to produce an output potential as represented by the pulse 70. The trailing edge of the pulse 70 is effective to trigger the single-shot circuit 40 to produce an output pulse as represented by the wave form 72. However, at the time of occurrence of the pulse 72, there is no output potential produced by the zero-crossing detector which may provide, together with the pulse 72, a coincident input to the AND circuit 30. Thus, no output is produced by the AND circuit 30 nor in any circuit following the AND circuit 30. Accordingly, the circuit 10 is unresponsive to frequencies differing from the predetermined frequency.

As shown in part III in FIG. 2 of the drawings, in response to an input signal as represented by the wave form 74 which has a frequency higher than the predetermined frequency of the signal 16, the pulses from detector 18 and multivibrator 40 are similarly not coincidental at the input of the AND circuit 30. The zero-crossing detector 18 is still effective in producing potential pulses near the occurrence of zero potential of the wave form 74; as represented at 76, 78, 80, and 82, for example. The occurrence of pulse 76 triggers the single-shot circuit 28 to produce an output pulse represented by the wave form 82. The trailing edge of this pulse again triggers the single-shot circuit 40 which, in turn, produces an output pulse as represented by the wave form 84. However, at the time of occurrence of this pulse, no output pulse is produced by the zero-crossing detector 18 which may be coincidentally applied to the AND circuit 30 with pulse 84. Thus, the AND circuit 30 does not produce an output potential, no transition in the state of circuit 54 occurs, and no output pulse is derived from the circuits 54 and 62.

The details of a zero-crossing detector circuit which is utilizable in block 18 in FIG. 1 of the drawings is shown in FIG. 3. In this circuit a transistor designated 86 of the PNP type having an emitter 88, a base 90, and a collector 92 is provided. The output from amplifier circuit 14 is applied to the base 90 through input terminal 94 and a capacitor 96. Appropriate biasing potentials are applied to the base 90 and collector 92 from a source of negative potential designated —V through respective resistors 98 and 100. A resistor 102 connected between base 90 and ground together with a resistor 98 to —V comprise a potential divider network for determining the direct biasing potential at base 90. A resistor 104 is connected between emitter 88 and ground. With an appropriate biasing potential —V, and proportioning of respective values of resistors in conjunction with the operating characteristics of transistor 86, a sine-wave as shown at 106, which is applied to the base 90 of transistor 86, is effective to produce a potential having a reverse sine-wave as shown at 108 at the collector 92. Since the emitter potential follows the input potential, a sine-wave as shown at 110 is produced at the emitter 88. The sine-waves 108 and 110 are applied through respective capacitors 112 and 114 across respective resistors 116 and 118. The potentials across these respective resistors are rectified by diodes 120 and 122 to produce respective waves 117 and 119 which combine at a common output terminal 124, to produce an output wave having a series of positive half sine-waves as shown at wave form 126.

For producing an output potential in response to the application of an input signal less than a predetermined value, a transistor 128 of the PNP triode type, having an emitter 130, a base 132, and a collector 134 is provided; and terminal 124 is directly connected to base 132. Collector 134 is directly connected to negative potential source —V and emitter 130 is connected to ground through a resistor 134. Thus, it is seen that with appropriate biasing of the transistor 128 a potential having the wave form as shown at 126 is effective to produce conduction through the transistor 128 only during periods of negative input potential as shown at wave form 129. At potentials greater than this predetermined value of input potential the transistor 128 is cut off. By maintaining the value of potential applied to transistor 128 of relatively high magnitude, the slope of the wave form 126 near the cusps is relatively steep. Thus, this wave form during successive periods of time that are near zero is relatively short. Accordingly, the output pulses produced at the emitter 130 of transistor 128 by reason of the conduction in the transistor 128 are relatively short. These pulses are negative and are applied through a capacitor 136 to an output stage of the zero-crossing detector. This stage includes a transistor 138 having an emitter 140, a base 142, and collector 144. Suitable biasing potentials are applied to the base 142 and collector 144 from a potential source +V through respective resistors 146 and 148. The pulses 129 are effective to produce positive pulses 150 at an output terminal 151 connected to the collector 144.

The trailing edges of the pulses of single-shot multivibrator 28 are used to trigger the multivibrator circuit 40. For good selectivity and to facilitate discrimination between relatively close frequencies, it is important that the recovery time of the circuit 28 be relatively short. That is, it is important that this circuit make a rapid transition from its transient condition fully to its quiescent condition at the end of each transient period.

The details of a circuit adaptable for operation as the monostable multivibrator 28 are shown in FIG. 4 of the drawings. In this circuit a pair of transistors 152 and 154 of the PNP triode type are cross-coupled. Transistor 152 has an emitter 156, a base 158, and a collector 160; and transistor 154 has an emitter 162, a base 164, and a collector 166. To effect the cross-coupling, a capacitor 168 is connected between collector 160 and base 164, and a resistor 170 is connected between collector 166 and base 158. Resistors 159 and 165 are connected between ground and respective bases 158 and 164. To increase the coupling between collector 166 and base 158, a capacitor 172 may be connected in parallel with resistor 170.

Biasing potentials are applied to the transistor elements to establish a quiescent condition of the circuit in which transistor 154 is conducting heavily and transistor 152 is substantially cut-off. To achieve such biasing, a source of negative potential, —V1, is connected to collector 160 through a resistor 174, to base 164 through an adjustable resistor 176, and to collector 166 through resistor 178. Input pulses are applied to collector 160 from an input terminal 180 connected to this collector through a capacitor 182 in series with a diode 184. The anode of diode 184 is connected to capacitor 182, and the junction between these elements is negatively biased by source —V1, connected thereto through a resistor 186.

To achieve rapid recovery of the circuit from its quiescent condition, a transistor 188 of the NPN triode type has its emitter 190 connected to potential source —V1, its collector 192 connected to a terminal of capacitor 168, and its base 194 connected through a capacitor 196 to collector 166. Suitable biasing potential is applied to base 194 by a source of negative potential, —V2, connected to this base through a resistor 198. Potential —V2 is sufficiently greater in absolute value than potential —V1 so that in the quiescent condition of the circuit, transistor 188 is biased to cut-off. Suitable emitter current return is provided by a resistor 200, and a capacitor 202 is connected between ground and both of the emitters 156 and 162.

In the quiescent condition of the circuit in FIG. 4, transistor 154 is in a condition of heavy conduction; transistor 152 is substantially cut-off, and capacitor 168 is charged to substantially —V1 with the plate connected to collector 160 being negative with respect to its other plate. In response to an incoming pulse of positive polarity applied to terminal 180, conduction in transistor 154 decreases, whereby its collector potential becomes more negative. This negative pulse is applied to base 158 through resistor 170 and capacitor 172 to increase conduction in transistor 152, whereby the potential at collector 160 becomes more positive. This increment of potential is applied through capacitor 168 to base 164 to further decrease conduction in transistor 154. This action is regenerative to the point that transistor 152 is conducting heavily and transistor 154 is substantially cut off. In this condition of the circuit, capacitor 168 discharges through a closed path including resistor 200, transistor 152, capacitor 168, and adjustable resistor 176. The potential developed across resistor 176 by this discharge current is such as to be positive at base 164. Thus, the transistor 154 is held cut off for the period that this discharge current is sufficiently great to produce a cut off potential at the base. During this period the collector 166 applies a negative output potential through capacitor 204 to output terminal 206. However, as this current decreases to a low value, the applied potential at base 164 no longer holds transistor 154 cut off, and it begins to conduct. This conduction results in a positive pulse at collector 166 and base 158 to decrease conduction in transistor 152. This, in turn, produces a negative pulse at collector 160 and base 164. Again, this action is regenerative, whereby transistor 152 assumes a cut-off condition and transistor 154 assumes a condition of saturation conduction.

Under the circumstances just mentioned wherein capacitor 168 completes its discharge and the conduction in transistor 154 produces a positive pulse at collector 166, the positive pulse is also applied to base 194 of transistor 188 to establish conduction therein. The conduction in transistor 188 is heavy relative to that in resistor 174, and thus, capacitor 168 is rapidly recharged to potential —V1.

In the foregoing description, for simplicity, circuits 18, 28, 40, and 30 are described as producing positive pulses in response to the various applied signals. It is noted, however, that these circuits may emit negative pulses as well, it being required only that the pulses to the logical circuit 30 have a predetermined correlation. As an example, zero-crossing detector 18 may be notified as by use of different types of transistors and different polarity potentials to produce negative rather than positive pulses, and the circuits 28 and 40 may be triggered by either positive or negative pulses, depending on the node of the circuit to which the same are applied. Both of these circuits are capable of producing either positive or negative pulses as an output. Accordingly, the output pulse taken from circuit 40 need only have a coincidental relationship with respect to that from circuit 18. In this case it is also possible to utilize different polarity pulses with a suitable inverter interposed in one of the inputs to AND circuit 30.

It should further be observed that while the preferred embodiment of invention employs a zero-crossing detector the detector circuit 18 may be made responsive to potentials within ranges other than potential ranges near zero value, to produce suitable output pulses. Purely as an example, the detector circuitry may employ bias potentials and circuitry so as to be responsive to the crests of potential waves of precisely determined magnitude.

It is noted that the response frequency of the receiver circuit 10 is readily and easily controllable by control of the widths of pulses produced by the respective component circuits. The width of pulses produced by the zero-crossing detector are controllable by the bias potentials and resistor values employed and the widths of pulses of the circuits 28 and 40 are readily and easily controlled by controlling the value of time constant resistors such as resistor 176 in the circuit of FIG. 4. This resistor may be an adjustable "trim" potentiometer which is physically a small unit.

Frequency tolerances may be varied in the circuit 10 for controlling the periods of the circuit pulses in relation to the half wave period of the input wave. Purely as an example, for low tolerances, the period of pulses from circuit 28 may be substantially 99% of a half wave period of the input wave and the pulses from circuit 40 may be substantially 2% of the half wave period while for greater tolerance the respective periods of pulses from circuits 28 and 40 may be 95% and 10% of a half wave period.

It is also to be noted that the circuit 10 is responsive to frequencies harmonic to the frequency of the predetermined input wave 16 to produce an output pulse of the type shown at 64. This is so because these harmonic frequencies will have zero potentials at the times that the potential of wave form 16 is zero. However, the spurious action produced by these harmonic frequencies may be avoided by the suitable use of high frequency filter circuits preceding the input terminal 12.

Although the signal 66 is shown as being of a frequency substantially one-half the frequency of signal 16, it should be noted that this disparity between frequencies is grossly exaggerated for purposes of explanation. In actuality the circuit 10 is capable of discriminating against frequencies differing very slightly from that of signal 16.

By reason of the characteristically short "rise" and "fall" times of the potential pulses produced by each of the several units of circuit 10, the circuit 10 possesses a remarkably great selectivity. Purely as an example, the width of different pulses may be controlled to provide a selectivity of 30 db per octave and this is many times greater than the selectivity presently attainable with LC resonant circuits of comparable cost and quality.

While the invention has been particularly shown and described with reference to a preferred embodiment thereof, it will be understood by those skilled in the art that various changes in form and details may be made therein without departing from the spirit and scope of the invention.

1. A data recognition circuit for discriminating as to frequency of an applied signal that periodically alternates about a particular reference amplitude level and which has characteristic frequencies falling within a predetermined reference band of frequencies that is representative of the presence of a binary digit or outside said predetermined reference band of frequencies which is representative of the absence of a binary digit, said circuit comprising:

a zero crossing circuit for detecting each zero crossing traverse of said applied signal through said reference amplitude level as said signal alternates about said reference amplitude level, said circuit supplying a relatively short output pulse in response to each such traverse and said output pulses thereby occurring in succession at a frequency which directly represents the frequency of said applied signal;

a first multivibrator circuit responsive to each output pulse from said zero crossing circuit to supply a pulse which has a duration that is slightly less than the duration of a half-period of the highest frequency of said applied signal;

a second mutivibrator circuit responsive to each pulse from said first multivibrator circuit as it terminates to supply a reference pulse related in such a manner to the pulse from said first multivibrator circuit that the combined duration of a pulse from said first multivibrator circuit and the related reference pulse from said second multivibrator circuit is at least as great as the duration of a half-period of the lowest frequency of said applied signal;

and circuit means responsive to a frequency representing pulse from said zero crossing circuit and a reference pulse from said second multivibrator circuit when they occur concurrently to supply an output which indicates that said applied signal falls within said predetermined reference band of frequencies.

2. A circuit for discriminating as to frequency of an applied signal that periodically alternates about a particular reference amplitude level which has characteristic frequencies that may fall within a predetermined reference band of frequencies or outside said predetermined reference band of frequencies, comprising:

a zero crossing circuit for detecting each zero crossing traverse of said applied signal through said reference amplitude level as said signal alternates about said reference amplitude level, said circuit supplying a relatively short output pulse in response to each such traverse and said output pulses thereby occurring in succession at a frequency which directly represents the frequency of said applied signal;

a first multivibrator circuit responsive to each output pulse from said zero crossing circuit to supply a pulse which has a duration that is slightly less than the duration of a half-period of the highest frequency of said applied signal;

a second multivibrator circuit responsive to each pulse from said first multivibrator circuit as it terminates to supply a reference pulse related in such a manner to the pulse from said first multivibrator circuit that the combined duration of a pulse from said first multivibrator circuit and the related reference pulse from said second multivibrator circuit is at least as great as the duration of a half-period of the lowest frequency of said applied signal;

and circuit means responsive to a frequency representing pulse from said zero crossing circuit and a reference pulse from said second multivibrator circuit when they occur concurrently to supply an output which indicates that said applied signal falls within said predetermined reference band of frequencies.

References Cited by the Examiner

UNITED STATES PATENTS

| | | | |
|---|---|---|---|
| 2,399,135 | 4/46 | Miller et al. | 328—30 |
| 2,835,804 | 5/58 | Luther | 328—207 |
| 2,959,737 | 11/60 | Simopoulas | 328—110 |
| 2,962,553 | 11/60 | Halina | 328—30 |
| 2,972,064 | 2/61 | Hurlbut | 307—88.5 |
| 3,020,483 | 2/62 | Losee | 328—110 |
| 3,072,855 | 1/63 | Chandler | 328—110 |

ARTHUR GAUSS, *Primary Examiner.*

JOHN W. HUCKERT, *Examiner.*